United States Patent
Weinekoetter et al.

(10) Patent No.: US 11,504,683 B2
(45) Date of Patent: Nov. 22, 2022

(54) METERING AND MIXING SYSTEM

(71) Applicant: Gericke AG, Regensdorf (CH)

(72) Inventors: Ralf Weinekoetter, Zürich (CH);
Georg Presch, Nöggenschwiel (DE);
Bernhard Meir, Oberengstringen (CH);
Raffael Roemer, Küsnacht (CH);
Florian Tegel, Singen (DE)

(73) Assignee: Gericke AG, Regensdorf (CH)

( * ) Notice: Subject to any disclaimer, the term of this patent is extended or adjusted under 35 U.S.C. 154(b) by 243 days.

(21) Appl. No.: 16/686,710

(22) Filed: Nov. 18, 2019

(65) Prior Publication Data
US 2020/0156028 A1     May 21, 2020

(30) Foreign Application Priority Data
Nov. 20, 2018 (DE) ................ 10 2018 129 148.5

(51) Int. Cl.
*B01F 15/00* (2006.01)
*G01F 13/00* (2006.01)
(Continued)

(52) U.S. Cl.
CPC .......... *B01F 35/2117* (2022.01); *B01F 23/53* (2022.01); *B01F 27/2123* (2022.01);
(Continued)

(58) Field of Classification Search
CPC ....... B28C 7/0481; B28C 7/12; B01F 25/715; B01F 35/715
See application file for complete search history.

(56) References Cited

U.S. PATENT DOCUMENTS

| 3,941,535 A | 3/1976 | Street |
| 6,155,709 A | 12/2000 | O'Callaghan |

(Continued)

FOREIGN PATENT DOCUMENTS

| CN | 108568247 A | 9/2018 |
| DE | 972 193 C | 6/1959 |

(Continued)

OTHER PUBLICATIONS

European Office Action dated Mar. 26, 2021, issued in corresponding European Patent Application No. 19210024.6 (and English Machine Translation).
Search Report dated Oct. 16, 2019 issued in corresponding DE patent application No. 10 2018 129 148.5 (and partial English translation).
(Continued)

*Primary Examiner* — Elizabeth Insler
(74) *Attorney, Agent, or Firm* — Posz Law Group, PLC

(57) ABSTRACT

A metering and mixing system has at least one mixing device, in particular a continuous mixing device, which has at least one mixing container with a receiving region for receiving a mixing product and at least one mixing unit for mixing the mixing product which is in the mixing container, with at least one first metering device which has at least one first metering container having a receiving region for receiving a first mixing product component and at least one conveying unit for conveying the first mixing product component from the first metering container to the mixing container, and with at least one second metering device which has at least one second metering container having a receiving region for receiving a second mixing product component and at least one metering unit.

4 Claims, 4 Drawing Sheets

Figure 1:
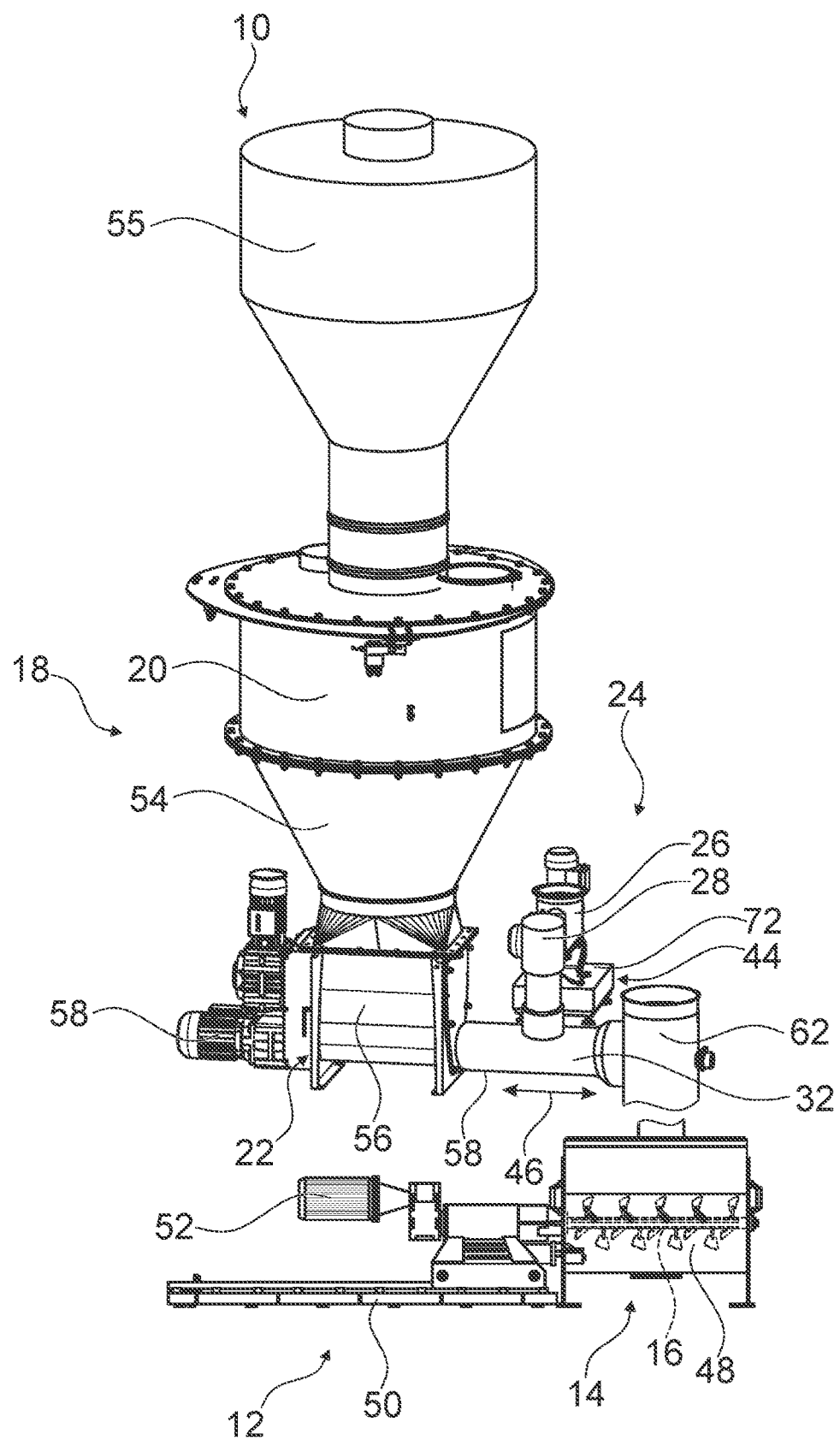

(51) Int. Cl.
    *G01G 19/22*     (2006.01)
    *B01F 7/04*     (2006.01)
    *B01F 15/02*     (2006.01)
    *B01F 3/12*     (2006.01)
    *B01F 35/21*     (2022.01)
    *B01F 23/53*     (2022.01)
    *B01F 27/70*     (2022.01)
    *B01F 27/2123*     (2022.01)
    *B01F 33/82*     (2022.01)
    *B01F 35/83*     (2022.01)
    *B01F 35/71*     (2022.01)

(52) U.S. Cl.
    CPC ............ *B01F 27/70* (2022.01); *B01F 33/821* (2022.01); *B01F 35/71775* (2022.01); *B01F 35/832* (2022.01); *G01F 13/005* (2013.01); *G01G 19/22* (2013.01)

(56) References Cited

U.S. PATENT DOCUMENTS 6,827,477 B2    12/2004    Chszaniecki
2017/0028366 A1\*    2/2017    Pullman .............. B01F 27/1145

FOREIGN PATENT DOCUMENTS

DE    41 19 261 A1    12/1992
GB    741403 A    11/1955
GB    2161090 A    1/1986

OTHER PUBLICATIONS

Extended European Search Report dated Apr. 17, 2020 issued in corresponding EP patent application No. 19210024.6 (and English translation).

European Office Action dated Nov. 16, 2021, issued in corresponding European Patent Application No. 19210024.6 (and English Machine Translation).

\* cited by examiner

METERING AND MIXING SYSTEM

CROSS REFERENCE TO RELATED APPLICATION

This application is based on and incorporates herein by reference German Patent Application No. 10 2018 129 148.5 filed on Nov. 20, 2018.

PRIOR ART

The invention relates to a metering and mixing system having a mixing device and having at least two metering devices.

A metering and mixing system has already been proposed having at least one mixing device, in particular a continuous mixing device, which has at least one mixing container with a receiving region for receiving a mixing product and at least one mixing unit for mixing the mixing product which is in the mixing container, with a first metering device which has at least one first metering container having a receiving region for receiving a first mixing product component and at least one conveying unit for conveying the first mixing product component from the first metering container to the mixing container, and having a second metering device which has at least one second metering container having a receiving region for receiving a second mixing product component and at least one metering unit.

An object of the invention is in particular to provide a generic device with improved properties with respect to compactness and flexibility. The object is achieved according to the invention by the features of patent claim 1 while advantageous embodiments and developments of the invention can be taken from the dependent claims.

Advantages of the Invention

The invention is based on a metering and mixing system having at least one mixing device, in particular a continuous mixing device, which has at least one mixing container with a receiving region for receiving a mixing product and at least one mixing unit for mixing the mixing product which is in the mixing container, with at least one first metering device which has at least one first metering container having a receiving region for receiving a first mixing product component and at least one conveying unit for conveying the first mixing product component from the first metering container to the mixing container, and with at least one second metering device which has at least one second metering container having a receiving region for receiving a second mixing product component and at least one metering unit.

It is proposed that the at least one metering unit be configured to supply the second mixing product component from the second metering container to the first metering device. Preferably, the metering unit is configured to supply the second mixing product component directly to the first metering device. In particular, the metering unit is connected directly to the first metering device. Preferably, the second metering device is free from a first mixing product component during operation, wherein the first metering device during operation, in particular in the conveying unit, is at least partially filled with the second mixing product component. It would also be preferably conceivable to connect an additional second metering device to the first metering device and/or to provide an additional third metering device. The term "metering and mixing system" is intended in this context to be understood to be in particular a system which is configured for a defined metering and a subsequent mixing of at least two components. Preferably, a metering and a subsequent mixing are carried out in direct succession, in particular continuously. In a particularly preferred manner, a metering is carried out directly in a mixing container of a mixing device of the system. In a particularly preferred manner, the system comprises a mixing device and at least two metering devices. The term "mixing container" is intended in this context to be understood to be in particular a container in which a mixing operation of the mixing device is at least partially carried out. Preferably, this is in particular intended to be understood to be a container which has a receiving region for receiving a mixing product. The mixing product is in particular received for a mixing operation in the container. In a particularly preferred manner, there is arranged in the mixing container a mixing unit which is configured for mixing the mixing product. Preferably, the mixing container has an at least substantially cylindrical basic form. Furthermore, in this context the term "mixing unit" is intended to be understood to be in particular a unit which is configured for mixing the mixing product in the mixing container. Various mixing units which appear to be advantageous to a person skilled in the art are provided for mixing the mixing product. Preferably, the mixing unit has at least one mixer shaft.

The term "metering container" is intended in this context to be understood to be in particular a container from which a mixing product component is removed for metering, in particular automatically. Preferably, the metering container is used for receiving, in particular for temporarily storing a mixing product component. The term "conveying unit" is intended in this context to be understood to be in particular a unit of the metering device which is configured for defined metering and/or conveying, in particular for continuous metering, that is to say, in particular the true-to-recipe continuous addition of the components, of a mixing product component from the metering container, in particular in the mixing container. Preferably, the conveying unit is configured to convey a defined quantity, in particular a defined mass flow, and/or a defined volume flow of a mixing product component from the metering container. Preferably, the conveying unit has a guide channel and at least one conveying tool. Preferably, the conveying tool is, for example, formed by a screw. Various conveying units which appear to be advantageous to a person skilled in the art are conceivable, such as, for example, a metering screw. The term "metering unit" is intended in this context to be understood to be in particular a unit of the metering device which is configured for defined removal of a mixing product component from the metering container, in particular in the mixing container. Preferably, the metering unit is configured to remove a defined quantity and/or a defined volume flow of a mixing product component from the metering container. Preferably, removal can be carried out both by means of a conveying tool and by means of a valve and/or a flap valve, such as in particular by means of a metering and/or butterfly valve. Preferably, the metering unit is formed by a conveying unit.

The term "configured" is in particular to mean specifically programmed, designed and/or adapted. It is in particular to mean that an object is configured for a specific function that the object performs and/or carries out this specific function in at least one application and/or operating state.

As a result of the configuration according to the invention of the metering and mixing system, in particular an advantageously compact metering and mixing system for at least two mixing product components can be provided. In particular, a pre-mixing of the mixing product components in the first metering device can already be achieved. An advantageously reliable thorough mixing and/or advantageously short mixing times can thereby be achieved. An advantageously short mixing time can in particular be achieved in comparison with conventional metering and mixing systems, in particular between 0.1 and 10 seconds.

It is further proposed that the at least one metering unit be configured to supply the second mixing product component from the second metering container to the conveying unit. Preferably, the second mixing product component is supplied directly from the metering unit to the conveying unit. Preferably, the second metering unit opens into the conveying unit and is configured to supply the second mixing product component to the first mixing product component in the conveying unit. An advantageously compact metering and mixing system can thereby be provided. An advantageously small construction height of the metering and mixing system can in particular be achieved. In particular, the second mixing product component can thereby already be added in the conveying unit to the first mixing product component. Furthermore, an advantageously small cleaning complexity can thereby be achieved when changing products. As a result of the compact metering and mixing system, a minimal amount of equipment has to be cleaned in the case of product changes, such as, for example, when changing flavours. It is thereby possible to prevent in particular cross-contaminations in the case of incompatible products, such as in particular as a result of allergens, halal, kaschrut, that is to say, in particular kosher dishes, or the like.

It is further proposed that the at least one conveying unit be configured in at least one mixing section of the conveying unit for mixing the first mixing product component and the second mixing product component. Preferably, the metering unit is configured to supply the second mixing product component before the mixing section to the conveying unit. Preferably, the conveying unit has the mixing section. In a particularly preferred manner, the conveying unit has at least one metering section and one mixing section. The mixing section is in particular configured for selective thorough mixing of the mixing product components. Preferably, the conveying unit has in the at least one mixing section a mixer shaft and/or a conveying tool which is constructed as a mixer shaft. Preferably, the conveying tool forms in the mixing section a mixer shaft. In principle, however, it would also be conceivable for the conveying unit to have a separate mixer shaft. In particular, the second mixing product component can thereby already be added in the conveying unit to the first mixing product component. It is thereby possible to achieve an advantageously reliable thorough mixing and/or advantageously short mixing times. An advantageously short mixing time can in particular be achieved in comparison with conventional metering and mixing systems, in particular between 0.1 and 10 seconds.

It is further proposed that the at least one conveying unit have a guide channel and a conveying tool which is driven in rotation in the guide channel. Preferably, the conveying tool comprises a drive shaft which extends through the guide channel. Different conveying tools which appear to be advantageous to a person skilled in the art are conceivable. Preferably, the conveying tool is at least partially constructed as a metering screw. The conveying tool is in particular configured for conveying a defined quantity and/or a defined volume flow of a mixed product component out of the metering container. The guide channel is in particular formed by a cylindrical channel which extends from the first metering container to the mixing container and/or an inlet channel of the mixing container. In particular, an advantageous conveying unit can thereby be provided. In particular, a conveying unit can be provided which is particularly configured for an advantageously precise conveying and metering of a mixing product component.

It is further proposed that the conveying tool of the conveying unit be constructed as a mixing tool in the at least one mixing section of the conveying unit. Preferably, the conveying tool of the conveying unit is constructed as a mixer shaft in the at least one mixing section of the conveying unit. Preferably, the conveying tool is constructed in one piece and has at least one mixing tool and at least one metering tool. The term "mixer shaft" is in this instance intended to be understood to be in particular a mixing tool which has at least one shaft and at least one mixing means which is arranged on a periphery of the shaft, in particular at least one paddle. During a mixing operation, the mixer shaft is in particular driven in a rotational manner. The term "in one piece" is intended to be understood to be in particular connected at least in a materially engaging manner, for example, by a welding process, an adhesive-bonding process, an injection-moulding process and/or another process which appears to be advantageous to the person skilled in the art and/or advantageously formed in one piece, such as, for example, by being produced from a casting and/or by being produced with a one-component or multiple-component injection-moulding method and advantageously from a single blank. In particular, an advantageous conveying unit can thereby be provided. In particular, it is possible to provide a conveying unit which can further be used for mixing the mixing product components in addition to conveying and metering a mixing product component.

In particular, an advantageously high level of homogeneity of the mixing product can thereby be ensured, even in the case of very low component proportions.

It is further proposed that the conveying tool of the conveying unit be constructed as a metering screw in a metering section of the conveying unit different from the mixing section of the conveying unit. Preferably, the metering section directly adjoins the mixing section. Preferably, the metering section is arranged upstream of the mixing section in the conveying direction of the conveying unit. In a particularly preferred manner, a drive shaft of the conveying tool extends through the metering section and through the mixing section. The metering screw is in particular formed by an Archimedes' screw for a screw conveyer. Preferably, however, the metering screw merges into a mixer shaft. In principle, however, it would be conceivable for the mixer shaft also to be configured at least partially for conveying the mixing product components. In particular, an advantageous conveying unit can thereby be provided. In particular, a conveying unit can be provided which is particularly configured for an advantageously precise conveying and metering of a mixing product component.

It is further proposed that the guide channel of the conveying unit have an inner diameter which is in a mixing section of the conveying unit increased with respect to the metering section. Preferably, the inner diameter of the guide channel in the mixing section is at least 2%, preferably at least 5% and particularly preferably at least 10% greater with respect to the inner diameter of the guide channel in the metering section. Preferably, the guide channel delimits a circular cross-section both in the metering section and in the mixing section. The guide channel has in particular an annular cross-section. In particular, an improved thorough mixing can thereby be achieved. In principle, however, it would also be conceivable for the guide channel of the conveying unit to have an identical inner diameter in a mixing section and the metering section of the conveying unit.

It is further proposed that the at least one metering unit be formed by a conveying unit and have a guide channel and a conveying tool, wherein the guide channel of the metering unit opens in a central region into the guide channel of the conveying unit. Preferably, the conveying tool of the metering unit is formed by a metering screw. The term "central region" is intended in this context to be understood to be in particular a region of the guide channel which extends between two end regions of the guide channel. Preferably, the guide channel can be divided into three regions with identical lengths in the main extent direction thereof, a first end region, a central region and a second end region. The central region is located in the main extent direction of the guide channel in particular between the first end region and the second end region. The regions are delimited in a radial direction in particular by an outer diameter of the guide channel. In this case, the term "main extent direction" of an object is in particular intended to be understood to be a direction which extends parallel with the longest edge of the smallest geometric parallelepiped which still just surrounds the object completely. The main extent direction of the guide channel corresponds in particular to a main extent direction of the conveying unit and extends parallel with a drive axis of the conveying tool of the conveying unit. The second mixing product component can thereby already be added in the conveying unit to the first mixing product component. An advantageously reliable thorough mixing and/or advantageously short mixing times can thereby be achieved. An advantageously short mixing time can in particular be achieved in comparison with conventional metering and mixing systems, in particular between 0.1 and 10 seconds. Furthermore, a very synchronous start and stop behaviour of the two metering devices can thereby be achieved, particularly if, for example, the filling line has disruptions.

It is further proposed that a maximum conveying power of the conveying unit be substantially greater than a maximum conveying power of the metering unit. Preferably, the maximum conveying power of the conveying unit is at least five, preferably at least ten, preferably at least one hundred and particularly preferably at least five hundred times greater than a maximum conveying power of the metering unit. Preferably, the first metering device has substantially greater dimensions than the second metering device. The term "substantially greater" is intended in this context to be understood to be in particular to mean that a value, in particular a value of a power, is greater at least by a factor of three, preferably by a factor of ten, preferably by a factor between 100 and 10,000, than a comparison value, in particular a value of the power of the comparison unit. In particular, an advantageously compact metering and mixing system can thereby be provided. In particular, an advantageously flexible use of the metering and mixing system can be achieved. In particular, ratios of the metering flows of from 1:3 to 1:10,000 can advantageously be achieved as a result. In particular, a ratio between 1:100 and 1:10,000 is particularly preferred. Furthermore, the investment costs of the metering and mixing system can thereby be kept low.

It is further proposed that the first metering device and/or the second metering device be formed by a gravimetric screw feeder. Preferably, the first metering device and the second metering device are each formed by a gravimetric screw feeder. The screw feeder is in this case in particular integrated in a weighing system, wherein the mass flow which leaves the first metering device and/or the second metering device as a result of the rotation of the conveying tool of the conveying unit and/or the conveying tool of the metering unit is measured and compared with a desired value. When using a plurality of metering devices, it is further in particular ensured that the mixing product components reach the mixing device in the correct recipe proportion. In particular, the fine mixing is then carried out in the mixing device, wherein the mean mixing time or dwell time may be from a few seconds to several hours. An advantageously reliable metering and mixing system can thereby in particular be provided.

It is further proposed that the metering and mixing system have a control and/or regulation unit which is configured for synchronously controlling and/or regulating the first metering device and the second metering device. Preferably, the control and/or regulation unit is configured to start up and stop the drives of the first metering device and the second metering device simultaneously so that a recipe is always correct. Furthermore, an advantageously synchronous starting and stopping behaviour of the two metering devices can thereby be achieved, particularly if, for example, the filling line has disruptions. The term "control and/or regulation unit" is in particular intended to be understood to be a unit having at least one electronic control unit. The term "electronic control unit" is in particular intended to be understood to be a unit having a processor unit and having a storage unit and having an operating programme which is stored in the storage unit. Preferably, however, the control and/or regulation unit is formed by a memory-programmable control unit.

Furthermore, the invention relates to a method for operating the metering and mixing system. It is proposed that the first metering device and the second metering device be started and/or stopped synchronously by means of the control and/or regulation unit. Preferably, during operation the drives of the first metering device and the second metering device are simultaneously started and stopped so that a recipe is always correct. Furthermore, an advantageously synchronous starting and stopping behaviour of the two metering devices can thereby be achieved, particularly if, for example, the filling line has disruptions.

It is further proposed that a first mixing product component which leaves the first metering device and a second mixing product component which leaves the second metering device be detected continuously by means of a weighing system. It is further proposed that a ratio of a weight of the first mixing product component which leaves the first metering device and a weight of the second mixing product component which leaves the second metering device be compared with a desired value. Preferably, the first metering device and the second metering device are in this case integrated in a weighing system, wherein the mass flow which leaves the first metering device and/or the second metering device as a result of the rotation of the conveying tool of the conveying unit and/or the conveying tool of the metering unit is measured and compared with a desired value. Furthermore, it is ensured by means of the first metering device and the second metering device that the mixing product components reach the mixing device in the correct recipe proportion. In particular, the fine mixing is then carried out in the mixing device, wherein the mean mixing time or dwell time may be from a few seconds to several hours. An advantageously reliable metering can thereby in particular be achieved. Preferably, advantageously precise recipe proportions can thereby be adjusted.

The metering and mixing system according to the invention and the method are not intended to be limited in this instance to the above-described application and embodiment. In particular, the metering and mixing system according to the invention and the method may have, for carrying out an operating mode described herein, a number which is different from a number mentioned herein of individual elements, components and units and method steps. Furthermore, values which are within the mentioned limits are also intended to be deemed to be disclosed and able to be freely used in the value ranges which are set out in this disclosure.

DRAWINGS

Additional advantages will be appreciated from the following description of drawings. One embodiment of the invention is illustrated in the drawings. The drawings, the description and the claims contain a number of features in combination. The person skilled in the art will advantageously also consider the features individually and combine them to form advantageous additional combinations.

Figure 2:
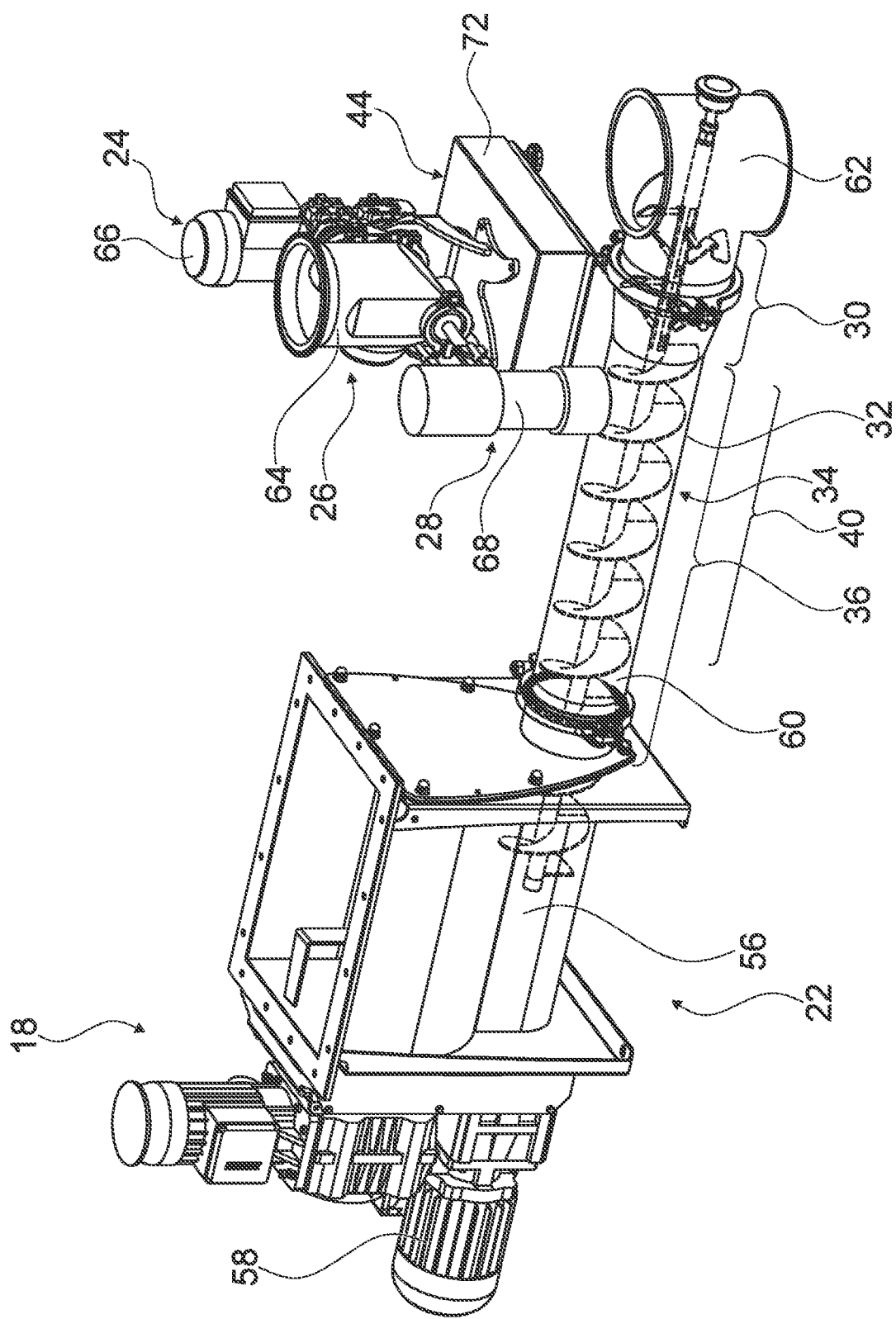
Figure 3:
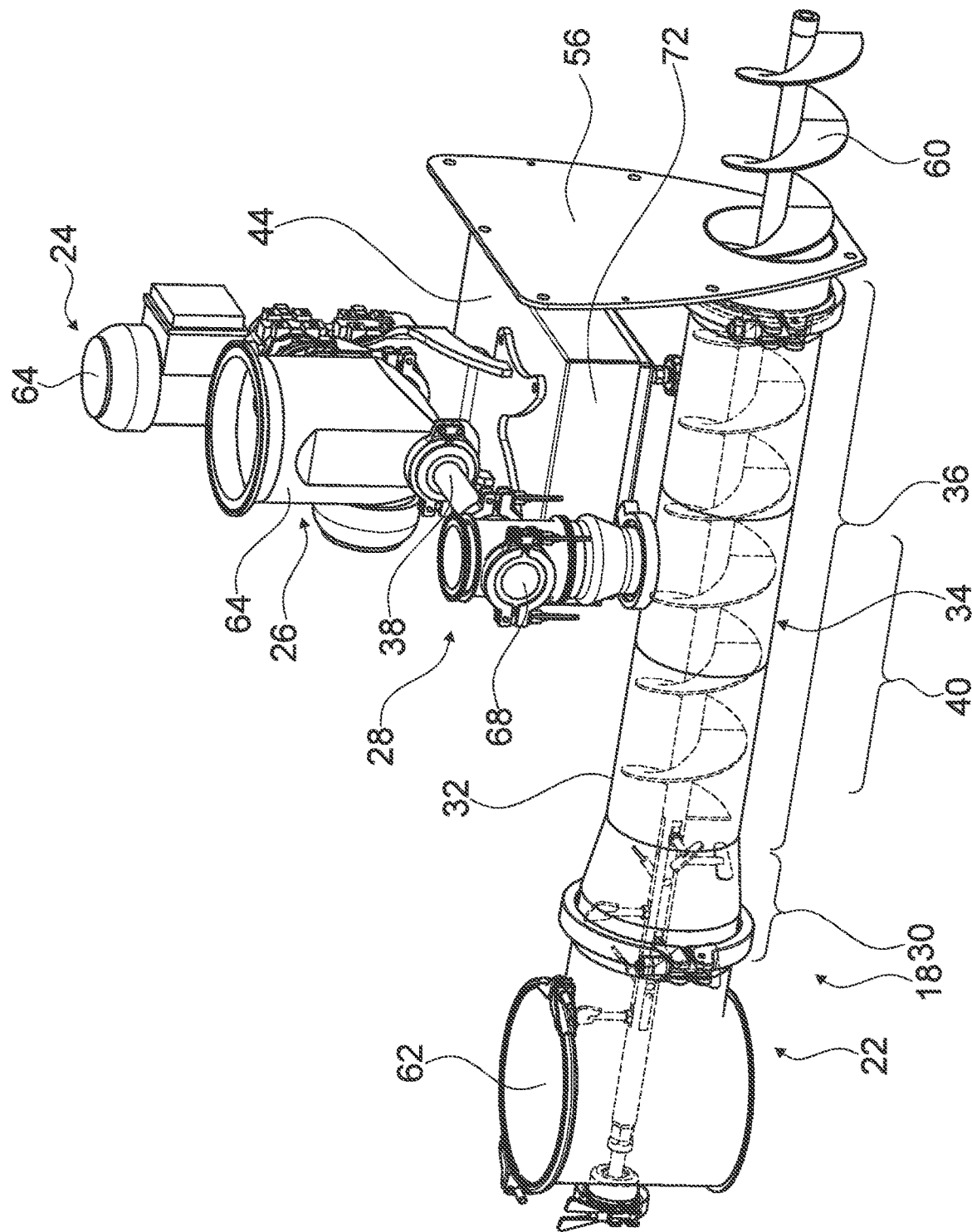
Figure 4:
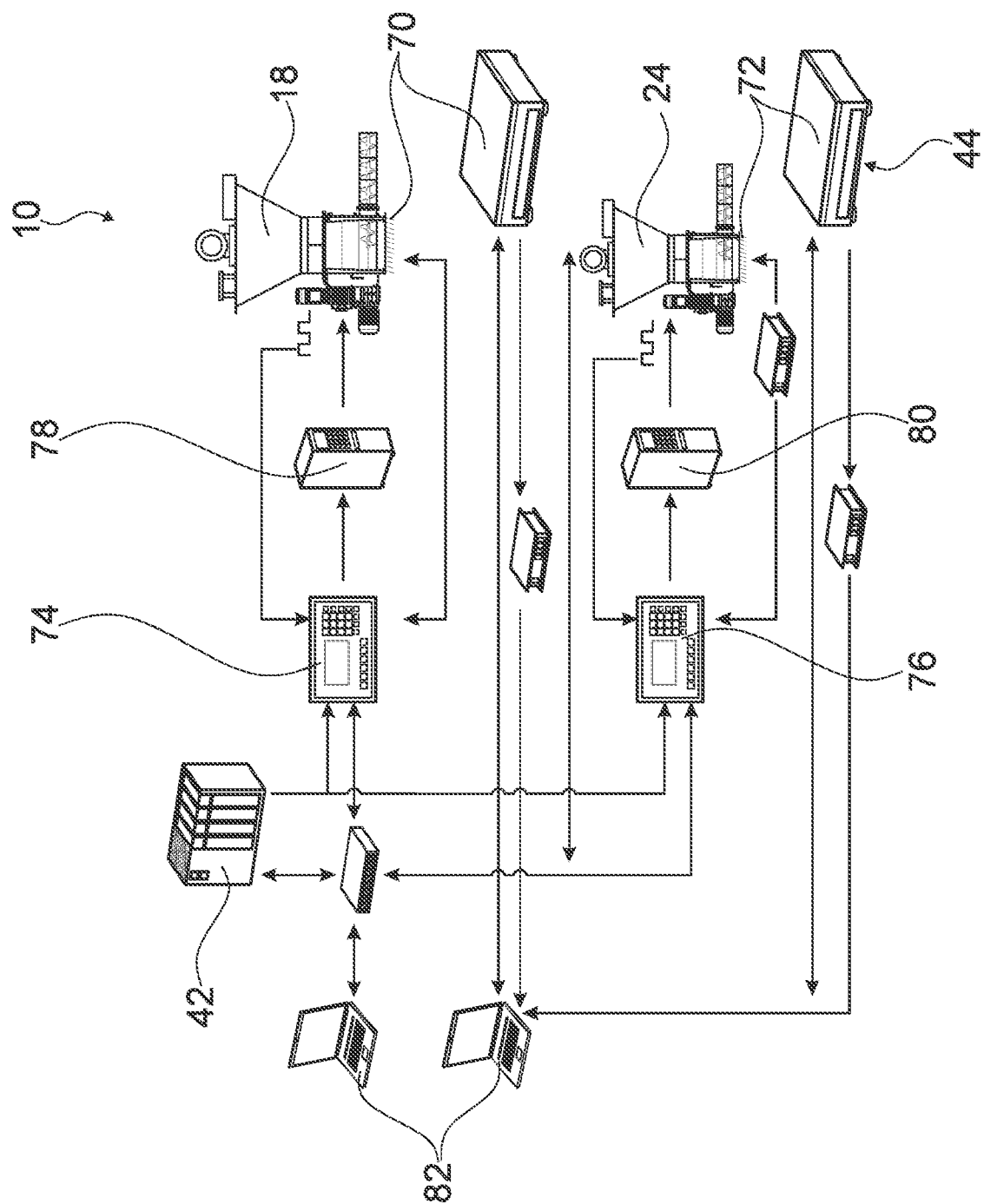

In the drawings:

FIG. 1 is a schematic illustration of the metering and mixing system according to the invention having a mixing device, having a first metering device and having a second metering device and an additional refilling container for the first metering device, FIG. 2 is a schematic illustration of the first metering device and the second metering device of the metering and mixing system according to the invention, FIG. 3 is a partial cutout of the first metering device having a conveying unit and the second metering device having a metering unit as a schematic partial section, and FIG. 4 is a schematic flow chart of a method for operating the metering and mixing system according to the invention.

DESCRIPTION OF THE EMBODIMENTS

FIG. 1 shows a metering and mixing system 10. The metering and mixing system 10 is in particular for a continuous mixing process. In principle, however, a different application of the metering and mixing system 10 which appears to be advantageous to a person skilled in the art would also be conceivable. The metering and mixing system 10 has at least two metering devices 18, 24, in particular for solids, and a subsequent mixing device 12 which mixes mixing product components in particular by rotation in a radial and axial manner.

The metering and mixing system 10 has the mixing device 12. The mixing device 12 is formed by a bulk material mixing device. The mixing device 12 is formed, for example, by a single-shaft mixer. The mixing device 12 is formed by a horizontally arranged single-shaft mixer. Preferably, the mixing device 12 can be configured both for batch type processes and continuous mixing processes. The mixing device 12 is formed by a continuous mixing device. The mixing device 12 is formed, for example, by a paddle mixer, in particular a horizontal paddle mixer. In principle, however, a different configuration of the mixing device 12 which appears to be advantageous to a person skilled in the art would also be conceivable. A homogeneous mixing of different mixing products is achieved by means of the mixing device 12 by random particle exchange, in particular by dispersion, and selective division and mixing, in particular by convection. The mixing device 12 is configured for mixing solids and solids with liquids. In principle, however, a different application which appears to be advantageous to a person skilled in the art would also be conceivable.

The mixing device 12 has a mixing container 14. The mixing container 14 has a cylindrical basic shape. A main extent direction 46 of the mixing container 14 extends during operation substantially horizontally. The mixing container 14 therefore has a horizontally cylindrical basic shape. Furthermore, the mixing container 14 forms a housing of the mixing device 12. The mixing container 14 has an outer shell 48. The outer shell 48 has a plurality of feet which support the mixing container 14. The mixing container 14 is preferably mounted on a frame 50 via the feet of the outer shell 48. The outer shell 48 substantially comprises metal. In principle, however, a different material configuration which appears to be advantageous to a person skilled in the art would also be conceivable. Furthermore, the mixing container 14 has a receiving region for receiving a mixing product. The receiving region has a cylindrical form. The receiving region has a constant cross-section along a centre axis, when viewed in a plane perpendicular to the centre axis. The centre axis of the receiving region extends parallel with the main extent direction 46 of the mixing container 14. The receiving region is partially delimited by the outer shell 48 of the mixing container 14. Furthermore, the mixing container 14 has two end walls. The end walls close the mixing container 14 at two opposite ends of the outer shell 48. The end walls delimit the receiving region at opposite ends along the centre axis of the receiving region. The mixing container 14 has a pivoting door in the region of an end wall. The end wall of the mixing container 14 is substantially completely formed by the pivoting door. The pivoting door is particularly used to make the receiving region of the mixing container 14 accessible. The pivoting door is formed by a front door.

Furthermore, the mixing device 12 has a mixing unit 16 which is supported, for example, at one side. The mixing unit 16 is configured for mixing the mixing product which is located in the mixing container 14. The mixing unit 16 is, for example, supported at one side in an end wall of the mixing container 14. The mixing unit 16 is formed by a shaft type mixing unit. The mixing unit 16 has a mixer shaft. A rotation axis of the mixer shaft extends parallel with the main extent direction 46 of the mixing container 14. The mixer shaft is formed by a free-running mixing tool which is supported at one side. The mixer shaft comprises a shaft and a plurality of mixing means which are arranged on a periphery of the shaft. The shaft of the mixer shaft is formed by a circular-cylindrical solid shaft. In principle, however, a different configuration of the shaft which appears to be advantageous to a person skilled in the art would also be conceivable, such as, for example, as a hollow shaft. The mixing means are each formed from paddles. In principle, however, a different configuration of the mixing means which appears to be advantageous to a person skilled in the art would also be conceivable. The mixer shaft is substantially arranged in the receiving region of the mixing container 14 during operation. The mixer shaft projects into the receiving region. The shaft of the mixer shaft projects at one end through one of the end walls out of the receiving region and is driven there by a drive unit 52. The drive unit 52 drives the mixer shaft via a gear mechanism which is not shown in greater detail. The drive unit 52 drives the mixer shaft in rotation. The drive unit 52 is formed by a motor. The drive unit 52 is formed by an electric motor. The mixing unit 16 is completely formed so as to be extensible from the mixing container 14. By drawing out the mixing unit 16, the mixer shaft can be withdrawn simply and completely from the mixer. The entire mixing container 14 is thus advantageously accessible for cleaning.

The metering and mixing system 10 further has a first metering device 18. The first metering device 18 is arranged upstream of the mixing device 12 along a mass flow of the mixing product components. The first metering device 18 is configured to supply at least one first mixing product component to the mixing device 12 in a defined manner. The first metering device 18 is formed by a gravimetric screw feeder. The first metering device 18 has a first metering container 20 having a receiving region for receiving a first mixing product component. The metering container 20 has a frustoconical basic shape, wherein an acutely tapering side is arranged at a lower side. The metering container 20 is constructed in a funnel-like manner. The metering container 20 has an outer shell 54 which delimits the receiving region of the metering container 20. A refilling container 55 of the first metering device 18 is arranged above the metering container 20. The metering container 20 can further be filled with the first mixing product component via the refilling container 55. The refilling container 55 is configured for a defined refilling of the metering container 20, wherein the refilling container 55 can be filled in particular automatically or manually with the first mixing product component. The refilling container 55 also has a frustoconical basic form, wherein an acutely tapering side is arranged on a lower side and opens into the metering container 20. The refilling container 55 is constructed in a funnel-like manner. Preferably, a valve, in particular a flap valve, via which the first mixing product component can be selectively directed from the refilling container 55 into the metering container 20 is arranged between the refilling container 55 and the metering container 20 in a manner which is not shown in greater detail.

The metering container 20 opens at a lower side into a supply housing 56 of a conveying unit 22. The first metering device 18 has a conveying unit 22. The conveying unit 22 has the supply housing 56. The supply housing 56 is arranged at a lower side of the metering container 20 and has a receiving region which adjoins the receiving region of the metering container 20. The supply housing 56 is configured for guiding the first mixing product component from the metering container 20 into a cylindrical conveying region of the conveying unit 22. Furthermore, the conveying unit 22 has a guide channel 32 and a conveying tool 34 which is driven in rotation in the guide channel 32. The supply housing 56 opens into the guide channel 32. The guide channel 32 has a receiving region which adjoins the receiving region of the supply housing 56. The guide channel 32 has a hollow-cylindrical basic form. The guide channel 32 is formed by a pipe. The guide channel 32 extends in particular horizontally. A main extent direction of the guide channel 32 corresponds in particular to the main extent direction 46 of the mixing container 14.

The conveying tool 34 of the conveying unit 22 has a rotationally driven shaft 60. The shaft 60 of the conveying tool 34 projects at one end through an outer wall of the supply housing 56 out of the receiving region and is driven there by a drive unit 58. The drive unit 58 drives the shaft 60 via a gear mechanism which is not shown in greater detail. The drive unit 58 drives the shaft 60 in rotation. The drive unit 58 is formed by a motor. The drive unit 58 is formed by an electric motor. The conveying unit 22 further has a mixing section 30 and a metering section 36. The mixing section 30 directly adjoins the metering section 36. The mixing section 30 is arranged at an end of the conveying unit 22 which is applied to the metering container 20. The mixing section 30 is completely arranged in the guide channel 32 while the metering section 36 extends from the supply housing 56 into the guide channel 32. The mixing section 30 is arranged downstream of the metering section 36 along the mass flow of the first mixing product component. The conveying tool 34 of the conveying unit 22 is constructed as a mixing tool in the mixing section 30 of the conveying unit 22. The shaft 60 of the conveying tool 34 has to this end a plurality of mixing means which are arranged at a periphery of a cylindrical base member of the shaft 60 in the mixing section 30. The mixing means are each formed by paddles. The additional paddles cause the mixing of mixing product components. In principle, however, a different configuration of the mixing means which appears to be advantageous to a person skilled in the art would also be conceivable. In particular, it would be conceivable for the mixing means further to be configured for conveying the mixing product components. Furthermore, the conveying tool 34 of the conveying unit 22 is constructed as a metering screw in a metering section 36 of the conveying unit 22 different from the mixing section 30 of the conveying unit 22. The conveying tool 34 of the conveying unit 22 is constructed as an Archimedes' screw in the metering section 36 of the conveying unit 22. The shaft 60 of the conveying tool 34 has to this end in the metering section 36 a wall which extends in a helical manner and which extends axially along the cylindrical base member of the shaft 60. In a radial direction, the wall has in particular a height which extends from the cylindrical base member of the shaft 60 as far as an inner side of the guide channel 32.

Furthermore, the guide channel 32 of the conveying unit 22 has an inner diameter which is increased with respect to the metering section 36 in the mixing section 30 of the conveying unit 22. The guide channel 32 expands towards the mixing section 30 to improve a mixing result. A diameter expansion affords the necessary space in the mixing chamber which is thereby formed.

The conveying unit 22 is configured for conveying the first mixing product component from the first metering container 20 to the mixing container 14. To this end, the guide channel 32 extends from the first metering container 20 as far as a vertical supply channel 62 of the mixing device 12. The supply channel 62 of the mixing device 12 is arranged at an upper side of the mixing container 14 and opens in the receiving region of the mixing container 14.

Furthermore, the metering and mixing system 10 has a second metering device 24. The second metering device 24 is arranged upstream of the mixing device 12 along a mass flow of the mixing product components. The second metering device 24 is configured to supply a second mixing product component to the mixing device 12 in a defined manner. The second metering device 24 is formed by a gravimetric screw feeder. The second metering device 24 has a second metering container 26 having a receiving region for receiving the second mixing product component. The second metering container 26 has a cylindrical basic shape, wherein the metering container 26 tapers towards a lower end. The second metering container 26 is constructed in a barrel-like manner, wherein two sides taper conically towards a lower side. The second metering container 26 has an outer shell 64 which delimits the receiving region of the metering container 26. The second metering container 26 is constructed in a half-tube-like manner at a lower side and opens at an end side into a metering unit 28 of the second metering device 24.

The second metering device 24 has a metering unit 28. The metering unit 28 is formed by a conveying unit. The metering unit 28 has a guide channel 38 and a conveying tool. The second metering container 26 opens at a lower side, in particular in a horizontal direction, into the guide channel 38. The guide channel 38 has a receiving region which adjoins the receiving region of the second metering container 26. The guide channel 38 has a hollow-cylindrical basic form. The guide channel 32 is formed by a pipe. The guide channel 38 extends horizontally. The conveying tool of the metering unit 28 has a rotationally driven shaft. The shaft of the conveying tool projects at one end through an outer wall of the second metering container 26 out of the receiving region and is there driven by a drive unit 66. The drive unit 66 drives the shaft via a gear mechanism which is not shown in greater detail. The drive unit 66 drives the shaft in rotation. The drive unit 66 is formed by a motor. The drive unit 66 is formed by an electric motor. The conveying tool of the metering unit 28 is constructed as a metering screw. The conveying tool is constructed as an Archimedes' screw. The conveying tool is guided in the guide channel 38 and projects partially into the receiving region of the second metering container 26.

The metering unit 28 is configured to supply the second mixing product component from the second metering container 26 to the first metering device 18. The metering unit 28 is configured to supply the second mixing product component from the second metering container 26 to the conveying unit 22. To this end, the guide channel 38 of the metering unit 28 extends from the second metering container 26 as far as a vertical supply channel 68 of the conveying unit 22. The supply channel 68 of the conveying unit 22 is arranged at an upper side of the guide channel 32 of the conveying unit 22 and opens into the receiving region of the guide channel 32 of the conveying unit 22. The guide channel 38 of the metering unit 28 opens in a central region 40 into the guide channel 32 of the conveying unit 22. The guide channel 38 of the metering unit 28 opens via the supply channel 68 in a central region 40 into the guide channel 32 of the conveying unit 22.

The conveying unit 22 is therefore configured in the mixing section 30 of the conveying unit 22 for mixing the first mixing product component and the second mixing product component. The mixing section 30 is arranged downstream of a merging of the mixing product components and therefore downstream of the supply channel 68 along the mass flow of the mixing product components.

A maximum conveying power of the conveying unit 22 is substantially greater than a maximum conveying power of the metering unit 28. The maximum conveying power of the conveying unit 22 is at least five, preferably at least ten, preferably at least one hundred and particularly preferably at least five hundred times greater than a maximum conveying power of the metering unit 28. The conveying unit 22 has, for example, a conveying power of 10 t/h. The metering unit 28 has by way of example a conveying power of 10 kg/h. In principle, a total power range of the conveying unit 22 and/or the metering unit 28 is from 500 g/h to 100 t/h. The ratio of the metering flows of the second metering device 24 to the first metering device 18 may be from 1:5 to 1:10,000. The second metering device 24 is particularly formed by a microfeeder.

The metering and mixing system 10 further has a weighing system 44. The first metering device 18 and the second metering device 24 are integrated in the weighing system 44. The weighing system 44 has a first weighing unit 70 which is configured to monitor a weight of the first metering device 18. To this end, the first metering device 18 is mounted, for example, on a stable platform of the first weighing unit 70 which is provided with a high-performance weighing equipment item. Furthermore, the weighing system 44 has a second weighing unit 72 which is configured to monitor a weight of the second metering device 24. To this end, the first metering device 24 is mounted on a stable platform of the second weighing unit 72 which is provided with a high-performance weighing equipment item. The weighing system 44 is configured to monitor a weight of the metering devices 18, 24, in particular of the mixing product components located therein. The weighing system 44 is configured to detect the mixing product components which leave the metering devices 18, 24.

Furthermore, the metering and mixing system 10 has a control and regulation unit 42. The control and regulation unit 42 is connected to the weighing system 44. The control and regulation unit 42 is configured for synchronously controlling and regulating the first metering device 18 and the second metering device 24. The control and regulation unit 42 is formed by a memory-programmable control unit.

FIG. 4 is a schematic flow chart of a method for operating the metering and mixing system 10 according to the invention. In the method, the first metering device 18 and the second metering device 24 are synchronously controlled and regulated by means of the control and regulation unit 42. For controlling and regulating the first metering device 18 and the second metering device 24, the control and regulation unit 42 is connected to a first control unit 74 associated with the first metering device 18 and a second control unit 76 of the weighing system 44 associated with the second metering device 24. The first control unit 74 and the second control unit 76 are each formed by way of example by an Easydos-Pro control unit. The first control unit 74 of the weighing system 44 is connected to the first weighing unit 70 and receives a measurement signal of the weighing unit 70. Furthermore, the first control unit 74 of the weighing system 44 is connected to the drive unit 58 of the first metering device 18 for controlling the conveying unit 22 via a frequency inverter 78. At the same time, a speed of the drive unit 58 is monitored by the first control unit 74. The second control unit 76 of the weighing system 44 is connected to the second weighing unit 72 and receives a measurement signal of the second weighing unit 72. Preferably, the measurement signal of the second weighing unit 72 is amplified during transmission to the second control unit 76. Furthermore, the second control unit 76 of the weighing system 44 is connected to the drive unit 66 of the second metering device 24 for controlling the metering unit 28 via a frequency inverter 80. At the same time, a speed of the drive unit 66 is monitored by the second control unit 76. Furthermore, the weighing system 44, in particular the first weighing unit 70 and the second weighing unit 72, and the control and regulation unit 42 are further connected to a processor unit 82 which is configured for synchronisation of the first drive unit 58 and the second drive unit 66. The processor unit 82 may be formed, for example, by a server or a computer.

During operation, the first metering device 18 and the second metering device 24 are synchronously started up and stopped by means of the control and regulation unit 42. Furthermore, during operation, in particular during mixing operation, a first mixing product component which leaves the first metering device 18 and a second mixing product component which leaves the second metering device 24 are continuously detected by means of a weighing system 44. Subsequently, a ratio of a weight of the first mixing product component which leaves the first metering device 18 and a weight of the second mixing product component which leaves the second metering device 24 is compared with a desired value. In the event of a deviation from the desired value, a detected ratio can be made to conform to the desired value by adapting the drive units 58, 66. A constant mass flow according to a recipe specification can thereby be ensured via the control and regulation unit 42.

REFERENCE NUMERALS

10 Metering and mixing system
12 Mixing device
14 Mixing container
16 Mixing unit
18 Metering device
20 Metering container
22 Conveying unit
24 Metering device
26 Metering container
28 Metering unit
30 Mixing section
32 Guide channel
34 Conveying tool
36 Metering section
38 Guide channel
40 Central region
42 Control and regulation unit
44 Weighing system
46 Main extent direction
48 Outer shell
50 Frame
52 Drive unit
54 Outer shell
55 Refilling container
56 Supply housing
58 Drive unit
60 Shaft
62 Supply channel
64 Outer shell
66 Drive unit
68 Supply channel
70 Weighing unit
72 Weighing unit
74 Control unit
76 Control unit
78 Frequency inverter
80 Frequency inverter
82 Processor unit

The invention claimed is:

1. A metering and mixing system having at least one mixing device which has at least one mixing container with a receiving region for receiving a mixing product, and at least one mixing unit for mixing the mixing product which is in the mixing container, with at least one first metering device which has at least one first metering container having a receiving region for receiving a first mixing product component and at least one conveying unit for conveying the first mixing product component from the first metering container to the mixing container, and with at least one second metering device which has at least one second metering container having a receiving region for receiving a second mixing product component and at least one metering unit,
wherein
the at least one metering unit is configured to supply the second mixing product component from the second metering container to the first metering device, wherein the at least one conveying unit has a guide channel and a conveying tool which is driven in rotation in the guide channel,
wherein the at least one conveying unit is configured in at least one mixing section of the conveying unit for mixing the first mixing product component and the second mixing product component, wherein the conveying tool of the conveying unit is constructed as a mixing tool in the at least one mixing section of the conveying unit, wherein the conveying tool of the conveying unit has a rotationally driven shaft, which has a plurality of mixing means which are arranged at a periphery of a cylindrical base member of the shaft in the mixing section, wherein the guide channel of the conveying unit has an inner diameter in the mixing section of the conveying unit which is increased with respect to the metering section, wherein the at least one metering unit is formed by a conveying unit and has a guide channel and a conveying tool, wherein the guide channel of the metering unit opens in a central region into the guide channel of the conveying unit, wherein the guide channel of the metering unit merges into the metering section of the conveying unit, wherein a maximum conveying power of the conveying unit is substantially greater than a maximum conveying power of the metering unit, and wherein the first metering device and the second metering device are formed by a gravimetric screw feeder.

2. The metering and mixing system as claimed in claim 1, wherein the at least one metering unit is configured to supply the second mixing product component from the second metering container to the conveying unit.

3. The metering and mixing system as claimed in claim 2, wherein the conveying tool of the conveying unit is constructed as a metering screw in a metering section of the conveying unit different from the mixing section of the conveying unit.

4. The metering and mixing system as claimed in claim 1, further comprising
a control and/or regulation unit which is configured for synchronously controlling and/or regulating the first metering device and the second metering device.

* * * * *